June 11, 1935. T. A. LYONS 2,004,504
FLUSHING TANK
Filed March 5, 1935
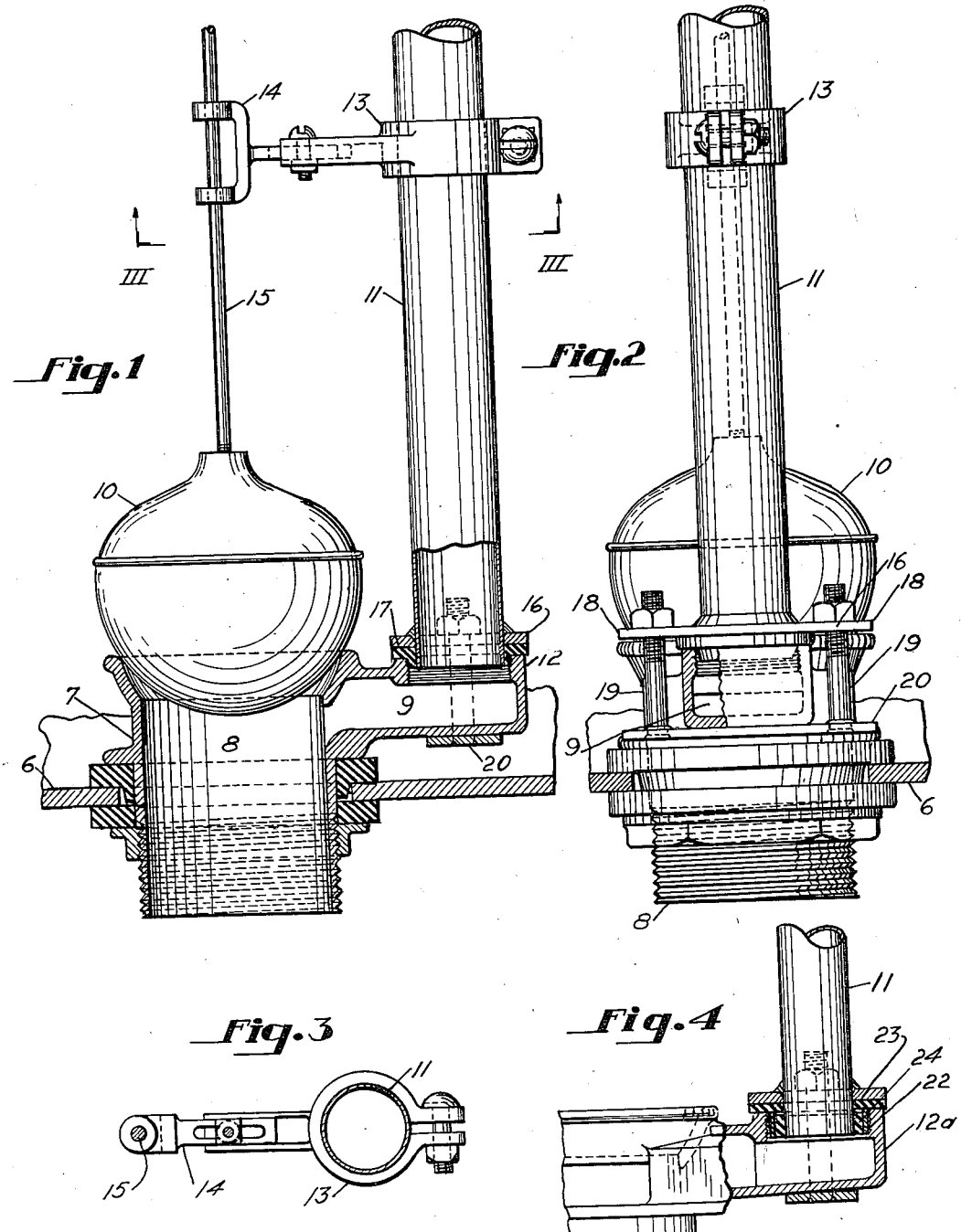
INVENTOR
Thomas A. Lyons,
By Archworth Martin,
Attorney.

Patented June 11, 1935

2,004,504

UNITED STATES PATENT OFFICE 2,004,504

FLUSHING TANK

Thomas A. Lyons, Pittsburgh, Pa.

Application March 5, 1935, Serial No. 9,372

5 Claims. (Cl. 4—57)

My invention relates to flushing tanks such as employed in connection with closet bowls, and more particularly to an improved arrangement of overflow device for the tanks.

In flushing tanks of this character, the overflow pipes which are employed for effecting discharge of excess quantities of water in the tank are usually screw-threaded into the discharge outlet. These pipes frequently break or become split or the threads corrode and become ineffective, so that the pipes have to be renewed, and usually all of the flushing connections have to be disassembled in order to remove the broken pipe end from the overflow conduit. Furthermore, the parts may be corroded or encrusted to such an extent that a new pipe cannot readily be inserted.

One object of my invention is to provide an overflow pipe and connection of such form that it can be readily applied to flushing tanks without disassembling the flushing conduit from the tank.

Another object of my invention is to provide a structure of the character referred to whereby overflow pipes of a given diameter can be applied to flushing conduits of various larger diameters.

Some of the forms which my invention may take are shown in the accompanying drawing wherein Figure 1 is a side view, partially in section, of flushing apparatus, including an overflow pipe; Fig. 2 is a rear view of the same partially in section; Fig. 3 is a view taken on the line III—III of Fig. 1; Fig. 4 is a view similar to Fig. 1, but showing a modified form of overflow connection.

Referring first to Figs. 1 to 3, a portion of a flushing tank is represented by the numeral 6. A discharge conduit 7 is mounted in the tank in the usual way, and has a main discharge outlet 8 and an overflow passageway 9. A ball valve 10 is operated in the usual manner to effect a flushing operation.

An overflow pipe 11 is mounted on the extension 12 of the casing 7 for discharge into the passageway 9. A split clamp 13 is secured to the upper portion of the pipe 11 and carries a guide 14 for the stem 15 of the flushing valve 10. The guide 14 is adjustable on the bracket-like extension of the clamp 13, so that it can be set in proper alignment with the valve seat.

At its lower end, the pipe 11 has welded or otherwise suitably secured thereto a collar or flange 16. A gasket 17 of rubber or other suitable material is slipped over the lower end of the pipe 11 in order to effect a water-tight seal when the pipe 11 is drawn down tightly into engagement with the casting 12. The collar 16 is extended at its opposite sides as indicated by the numeral 18 and is provided with holes into which clamping bolts 19 may be inserted. The lower ends of the bolts 19 are connected to a clamping bar 20 which lies beneath the extension 12. When the nuts of the bolts are tightened, the pipe 11 will be drawn down, and its collar 16 brought into sealing engagement with the gasket 17. This connection may be effected even if a portion of an old overflow pipe is still present in the threaded portion of the extension 12.

Referring now to Fig. 4, I show an overflow conduit having an extension 12a which corresponds to the extension 12. In this case, the overflow pipe 11 is provided with a collar and clamping members for holding it in place on the extension 12a in the manner shown in Fig. 1. However, a filler ring 22 is employed in order to effect centering of the overflow pipe on the casting 12a in those cases where the inlet opening and the extension is considerably oversized relative to the diameter of the overflow pipe 11.

A rubber gasket 23 is employed and also a packing ring 24. The ring 24 is shown as formed separately from the gasket 23, and may be simply in the form of a rubber collar or consist of tape wound on the pipe 11. This arrangement permits of the convenient application of overflow pipes to conduits of various larger diameters than the pipe in a snug-fitting manner, and avoids making adjustments of the guide 14 on its bracket, or in case a non-adjustable guide bracket is employed it will permit of proper vertical alignment of the bracket with respect to the flushing valve seat.

The invention is especially useful in connection with repair work because frequently a plumber will be called out on a repair job and find that he has with him no overflow pipe of the proper size, or he will be unable to remove the old pipe from the flushing extension without damaging the threads of the extension. Flushing pipes and connections made according to my invention will therefore be very useful.

I claim as my invention:—

1. The combination with flushing apparatus having a main discharge conduit, and an extension provided with an overflow passageway and an inlet opening, of an overflow pipe having a collar adjacent to its lower end, and a clamping device for rigidly drawing said collar into engagement with the said extension, with the lower end of the pipe positioned to discharge into the said overflow passageway.

2. The combination with flushing apparatus having a main discharge conduit, and an extension provided with an overflow passageway and an inlet opening, of an overflow pipe having a collar adjacent to its lower end, and a clamping device for rigidly drawing said collar into engagement with the said extension, with the lower end of the pipe positioned to discharge into the said overflow passageway, the said clamping device having engagement with the upper side of said collar and with the underside of said extension.

3. The combination with flushing apparatus having a main discharge conduit, and an extension provided with an overflow passageway and an inlet opening, of an overflow pipe having a collar adjacent to its lower end, and a clamping device for rigidly drawing said collar into engagement with the said extension, with the lower end of the pipe positioned to discharge into the said overflow passageway, the said clamping device consisting of a bar disposed beneath the said extension and bolts connected at their lower ends to said bar and at their upper ends to the said collar.

4. The combination with flushing apparatus having a main discharge conduit, and an extension provided with an overflow passageway and an inlet opening, of an overflow pipe having a collar adjacent to its lower end, and a clamping device for rigidly drawing said collar into engagement with the said extension, with the lower end of the pipe positioned to discharge into the said overflow passageway, the lower end of the pipe being extended downwardly beyond the said collar and projecting into the said extension.

5. The combination with flushing apparatus having a main discharge conduit, and an extension provided with an overflow passageway and an inlet opening, of an overflow pipe having a collar adjacent to its lower end, and a clamping device for rigidly drawing said collar into engagement with the said extension, with the lower end of the pipe positioned to discharge into the said overflow passageway, the lower end of the pipe being extended downwardly beyond the said collar and projecting into the said extension, and being surrounded with packing material filling the space between said extended portion and the adjacent wall of the said inlet opening.

THOMAS A. LYONS.